United States Patent
Berenbaum (10) Patent No.: US 10,822,114 B2
(45) Date of Patent: Nov. 3, 2020

(54) SYSTEMS AND METHODS FOR STATUS REPORTING FOR AIRCRAFT

(71) Applicant: Simmonds Precision Products, Inc., Vergennes, VT (US)

(72) Inventor: Arthur M. Berenbaum, Middlebury, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 0 days.

(21) Appl. No.: 16/265,073

(22) Filed: Feb. 1, 2019

(65) Prior Publication Data

US 2020/0165004 A1 May 28, 2020

Related U.S. Application Data (60) Provisional application No. 62/771,422, filed on Nov. 26, 2018.

(51) Int. Cl.
*G06F 3/048* (2013.01)
*B64D 45/00* (2006.01)
*G06F 3/0484* (2013.01)

(52) U.S. Cl.
CPC ........... *B64D 45/00* (2013.01); *G06F 3/0484* (2013.01); *B64D 2045/0085* (2013.01)

(58) Field of Classification Search
CPC ............ B64D 45/00; B64D 2045/0085; G06F 3/0484
USPC ........................................................ 715/772
See application file for complete search history.

(56) References Cited

U.S. PATENT DOCUMENTS

| | | | |
|---|---|---|---|
| 8,958,945 B2 * | 2/2015 | Ovens | B64F 5/00 701/33.2 |
| 8,981,967 B1 * | 3/2015 | Shore | B64F 5/00 340/945 |
| 9,600,944 B1 * | 3/2017 | Garel | G07C 5/08 |
| 9,710,145 B2 * | 7/2017 | Zammit-Mangion | G01C 23/00 |
| 9,747,564 B1 * | 8/2017 | Shi | G06T 7/001 |
| 9,849,999 B1 * | 12/2017 | Fymat | B64D 45/00 |
| 10,026,227 B2 | 7/2018 | Laughlin et al. | |
| 10,176,520 B2 * | 1/2019 | Kasik | G06Q 30/0643 |

(Continued)

OTHER PUBLICATIONS

Extended European Search Report dated Mar. 23, 2020, issued during the prosecution of European Patent Application No. 19210207.7.

*Primary Examiner* — David Phantana-angkool
(74) *Attorney, Agent, or Firm* — Locke Lord LLP; Scott Wofsy; Alicia J. Carroll (57) ABSTRACT

An aircraft monitoring system includes a sensor operatively connected to at least a portion of an aircraft, a memory configured to store instructions, and a processor disposed in communication with the memory and the sensor. The processor, upon execution of the instructions, is configured to display a graphical representation of the portion of the aircraft reflecting real-time monitoring activity, and display a monitoring controller. A method of providing a graphical user interface (GUI) for an aircraft monitoring system includes displaying a graphical representation of at least a portion of an aircraft's geometry reflecting real-time monitoring activity. The method includes displaying one or more monitoring controllers. Each monitoring controller is associated with at least a portion of an aircraft monitoring system and a location on the aircraft's geometry.

18 Claims, 11 Drawing Sheets

(56) References Cited

U.S. PATENT DOCUMENTS

| | | | |
|---|---|---|---|
| 10,296,183 B1* | 5/2019 | Peyras | G05B 19/41805 |
| 10,311,738 B2* | 6/2019 | Pratap | G08G 5/0021 |
| 10,424,211 B1* | 9/2019 | Tzarnotzky | G02B 27/01 |
| 2007/0266782 A1* | 11/2007 | Bartz | G06Q 10/087 |
| | | | 73/156 |
| 2010/0099393 A1* | 4/2010 | Brisebois | H04M 1/72522 |
| | | | 455/418 |
| 2013/0200991 A1* | 8/2013 | Ricci | G06F 3/04817 |
| | | | 340/4.3 |
| 2014/0253585 A1* | 9/2014 | Paul Dominic | G08G 5/0013 |
| | | | 345/629 |
| 2014/0282183 A1* | 9/2014 | Senesac | G06F 3/0484 |
| | | | 715/771 |
| 2014/0298227 A1* | 10/2014 | Gass | G06F 3/0484 |
| | | | 715/771 |
| 2015/0217857 A1 | 8/2015 | Mesguen et al. | |
| 2016/0004374 A1 | 1/2016 | Kneuper et al. | |
| 2017/0357915 A1* | 12/2017 | Holmes | G06F 3/04817 |
| 2018/0129635 A1 | 5/2018 | Saptharishi et al. | |
| 2019/0073029 A1* | 3/2019 | Filatov | G06F 3/0484 |

* cited by examiner

SYSTEMS AND METHODS FOR STATUS REPORTING FOR AIRCRAFT

CROSS-REFERENCE TO RELATED APPLICATIONS

This application claims the benefit of U.S. Provisional Patent Application No. 62/771,422, filed Nov. 26, 2018, which is hereby incorporated by reference in its entirety.

BACKGROUND

1. Description of Related Art

Aircraft monitoring systems, such as health monitoring systems are comprised of sensors, smart sensors, distributed controllers, hub controllers, Ground Station(s) and potentially servers that all play a role in the collection and processing of the data for such systems. There are multiple functions that take time from the time that data collection is started for a given portion or sub-system of the overall system to the time that results are available to an operator. For example, sensing, data transfer, data conversion, data re-factoring, data storage, data mining and data analysis functions are typically performed before an operator can view the aircraft health results in such a context. Additionally, in modern aircraft health monitoring systems it is possible to have multiple smart sensors, controllers and ground stations simultaneously collecting and processing data for the same aircraft at the same time but at different rates.

In sensor based aircraft health monitoring systems, such as health and usage management systems (HUMS) and structural health monitoring (SHM) systems, results are typically displayed as text and only for a single subsystem at any given time. The conventional techniques have been considered satisfactory for their intended purpose. However, there is an ever present need for improved aircraft monitoring systems.

SUMMARY

An aircraft monitoring system includes a sensor operatively connected to at least a portion of an aircraft, a memory configured to store instructions, and a processor disposed in communication with the memory and the sensor. The processor, upon execution of the instructions, is configured to display a graphical representation of the portion of the aircraft, and display a monitoring controller.

Each monitoring controller can include an active progress indicator representative of the progress toward a monitoring sub-function for the portion of the aircraft in real-time. Each monitoring controller can include at least one status indicator representative of the real-time status of a monitoring sub-function for the portion of the aircraft.

In accordance with another aspect, a method of providing a graphical user interface (GUI) for an aircraft monitoring system includes displaying a graphical representation of at least a portion of an aircraft's geometry. The method includes displaying one or more monitoring controllers. Each monitoring controller is associated with at least a portion of an aircraft monitoring system and a location on the aircraft's geometry.

In accordance with some embodiments, displaying the one or more monitoring controllers includes displaying each monitoring controller in a respective position more proximate to a portion of the graphical representation that corresponds to the location on the aircraft's geometry associated with the monitoring controller than to other portions of the graphical representation. The graphical representation can include displaying a first portion of the aircraft's geometry and a second portion of the aircraft's geometry. Displaying the one or more monitoring controllers can include displaying a first monitoring controller associated with the first portion. The first monitoring controller can be positioned closer to the first portion than the second portion.

Each monitoring controller can include at least one of an active progress indicator or a passive status indicator. Each monitoring controller can include a user entry area for receiving at least one of an on command, a start command or a download command. Displaying the one or more monitoring controllers can include displaying, for each monitoring controller, a plurality of passive status indicators indicative of statuses of respective sub-functions and, simultaneously, an active progress indicator indicative of which of the sub-functions is in progress. The method can include displaying both the active progress indicator and one of the plurality of passive status indicators to which the active progress indicator relates with a common graphical theme in order for a user to easily ascertain an overall status of the sub-functions The method can include providing a user entry area for receiving a start command configured and adapted to begin monitoring sub-functions for a plurality of monitoring controllers. The method can include displaying an active progress indicator that corresponds to the monitoring controller and is representative of the progress of a monitoring sub-function for the portion of the aircraft monitoring system associated therewith. The monitoring sub-function can include acquiring data, downloading data, transferring data, converting data and/or uploading data.

The method can include displaying a passive status indicator representative of the status of a monitoring sub-function for the portion of the aircraft monitoring system associated therewith. The method can include displaying a health status of at least one portion of the aircraft with a health indicator overlaid onto a portion of the graphical representation of the aircraft to which the health status pertains. The method can include providing a user entry area associated with the health indicator for receiving user commands to initiate system action. Displaying the graphical representation can include displaying the graphical representation on a computing device having a display screen. Displaying the one or more monitoring controllers can include displaying the one or more monitoring controllers on a computing device having a display screen.

In accordance with another aspect, a non-transitory computer readable storage medium has one or more computer programs stored therein associated with an aircraft monitoring system. The computer programs include instructions, which, when executed by a processor of a computer system, cause the processor to display a graphical representation of at least a portion of an aircraft's geometry and display one or more monitoring controllers. Each monitoring controller is associated with at least a portion of the aircraft monitoring system and a location on the aircraft's geometry.

These and other features of the systems and methods of the subject disclosure will become more readily apparent to those skilled in the art from the following detailed description of the embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION

Figure 1:
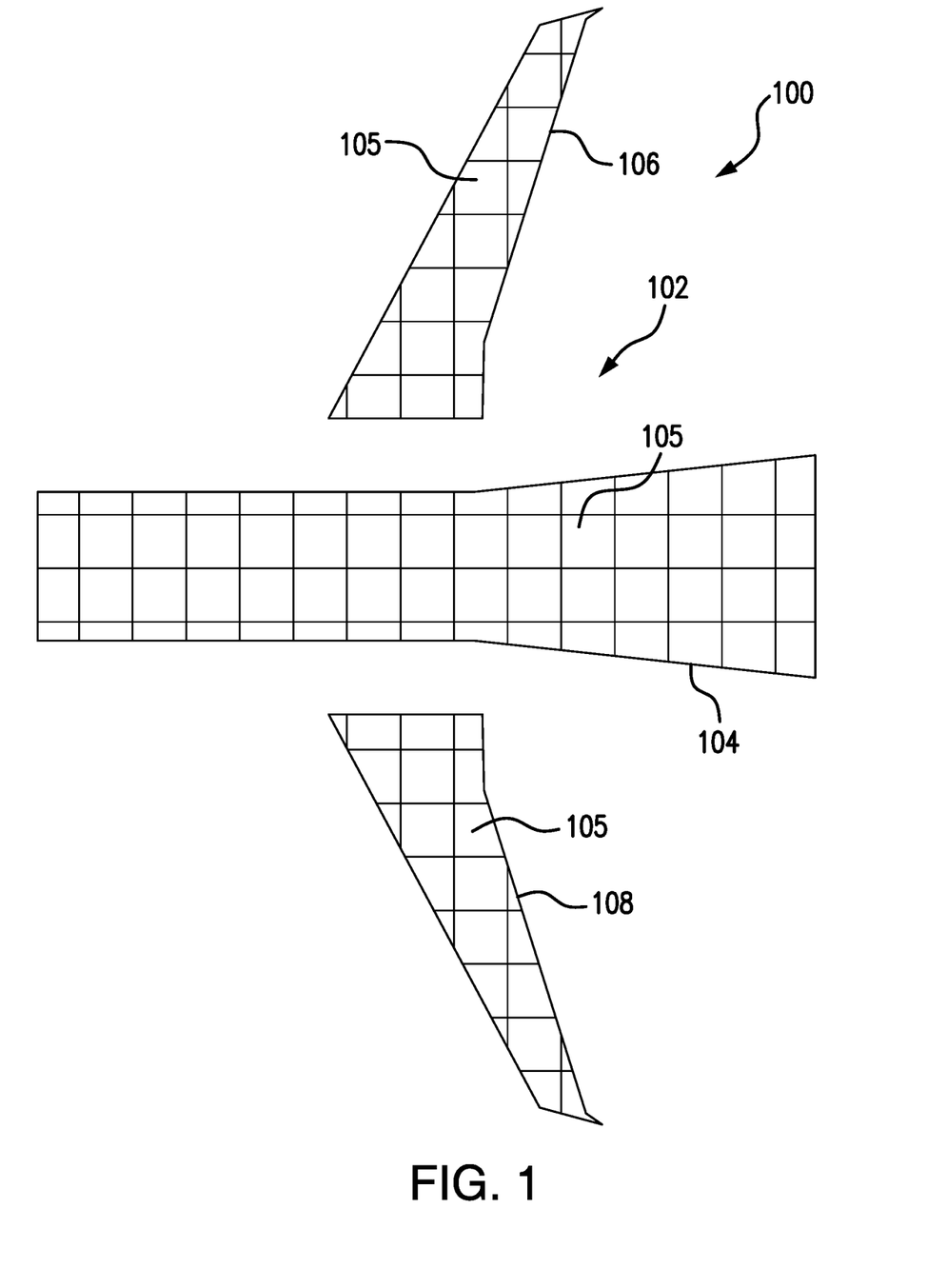
FIG. 1 depicts a graphical representation of an aircraft's geometry as displayed in a graphical user interface (GUI) for an aircraft monitoring system in accordance with embodiments of the present disclosure.
Figure 2:
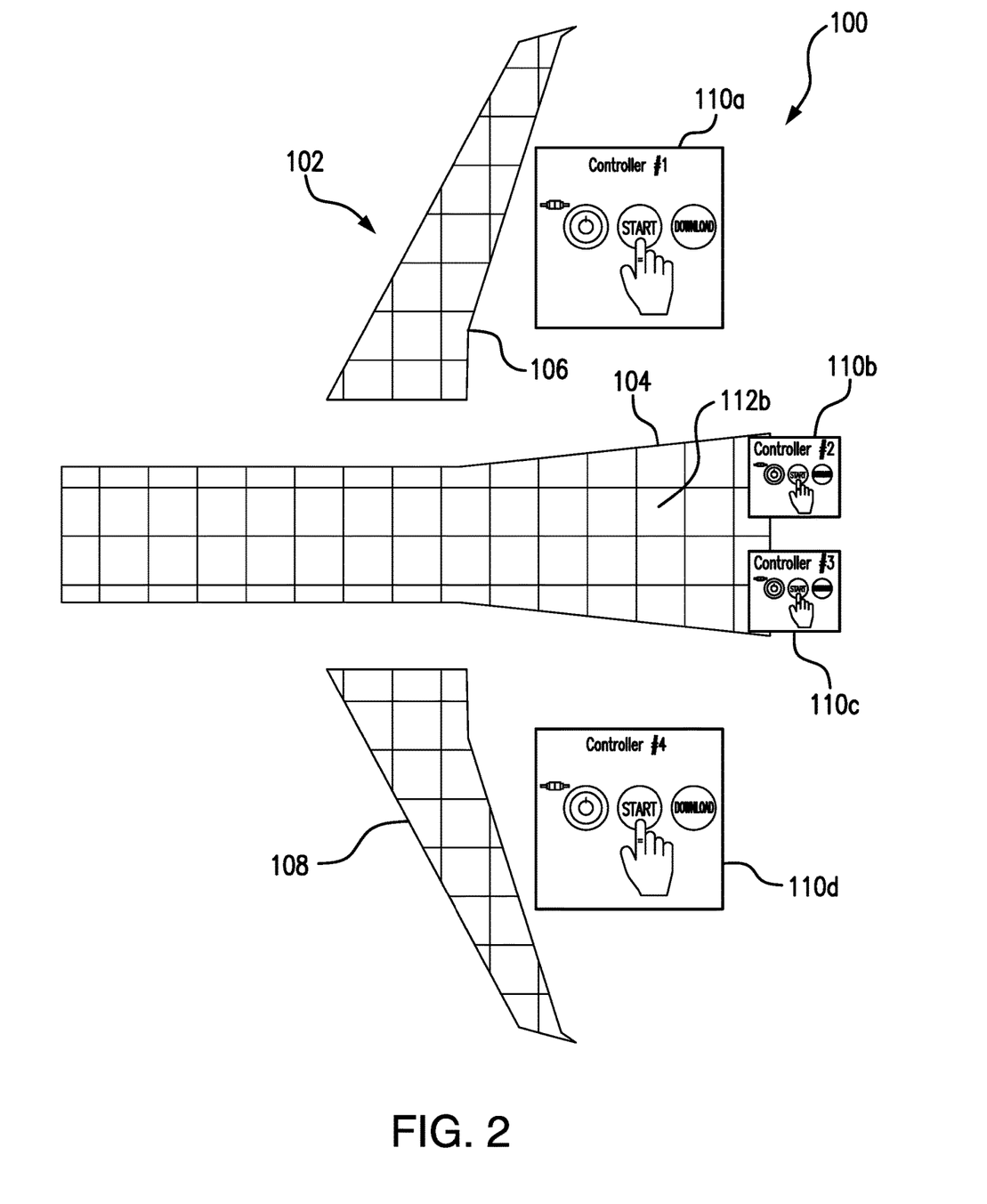
FIG. 2 depicts a graphical representation of an aircraft's geometry and monitoring controllers associated therewith as displayed in a graphical user interface (GUI) for an aircraft monitoring system in accordance with embodiments of the present disclosure.

Reference will now be made to the drawings wherein like reference numerals identify similar structural features or aspects of the subject disclosure. For purposes of explanation and illustration, and not limitation, a partial view of an exemplary embodiment of a graphical user interface (GUI) for an aircraft monitoring system in accordance with the disclosure is shown in FIG. 1 and is designated generally by reference character 100. Other embodiments of methods and systems in accordance with the disclosure, or aspects thereof, are provided in FIGS. 2-12, as will be described. The systems and methods described herein provide a graphical approach to status reporting that allows the operator to stay focused on results and other tasks at hand while still presenting a compact graphical status that can be easily overlaid on relevant result-oriented depictions of the aircraft.

The compactness of the systems and methods of the present disclosure provide advantages over traditional systems and methods. With traditional systems and methods, the nature of the display (text) does not permit compact, multi-dimensional status information that provides status and progress toward that status. Instead, traditional GUIs for aircraft monitoring systems typically only include a single status for the overall system in text form. Embodiments of the present disclosure permit display of the status and progress for multiple simultaneous subsystems that run at different rates. Moreover, embodiments of the present disclosure utilize easily recognizable status patterns that can be distinguished at a glance even when viewed from a distance. Additionally, the compact, graphical nature of the embodiments of the present disclosure provide status reporting that is easily viewed on modern devices such as tablets or smart phones.

As shown in FIG. 1, a graphical user interface (GUI) 100 includes a graphical representation of an aircraft's geometry 102. A method of providing a GUI, e.g. GUI 100, includes displaying a graphical representation of at least a portion of an aircraft's geometry, e.g. graphical representation 102. The graphical representation 102 includes a fuselage section 104 and two wing sections 106, 108. The graphical representation 102 is shown with grid lines that schematically represent segments 105 of a given monitored area, e.g. the fuselage or wing portions. Multiple segments 105 are typically monitored as a group as part of a single aircraft monitoring system (or a portion thereof), e.g. segments 105 of a given wing section 106 are monitored together and the monitoring is controlled by a given one of monitoring controllers 110*a*-110*d*.

Figure 12:
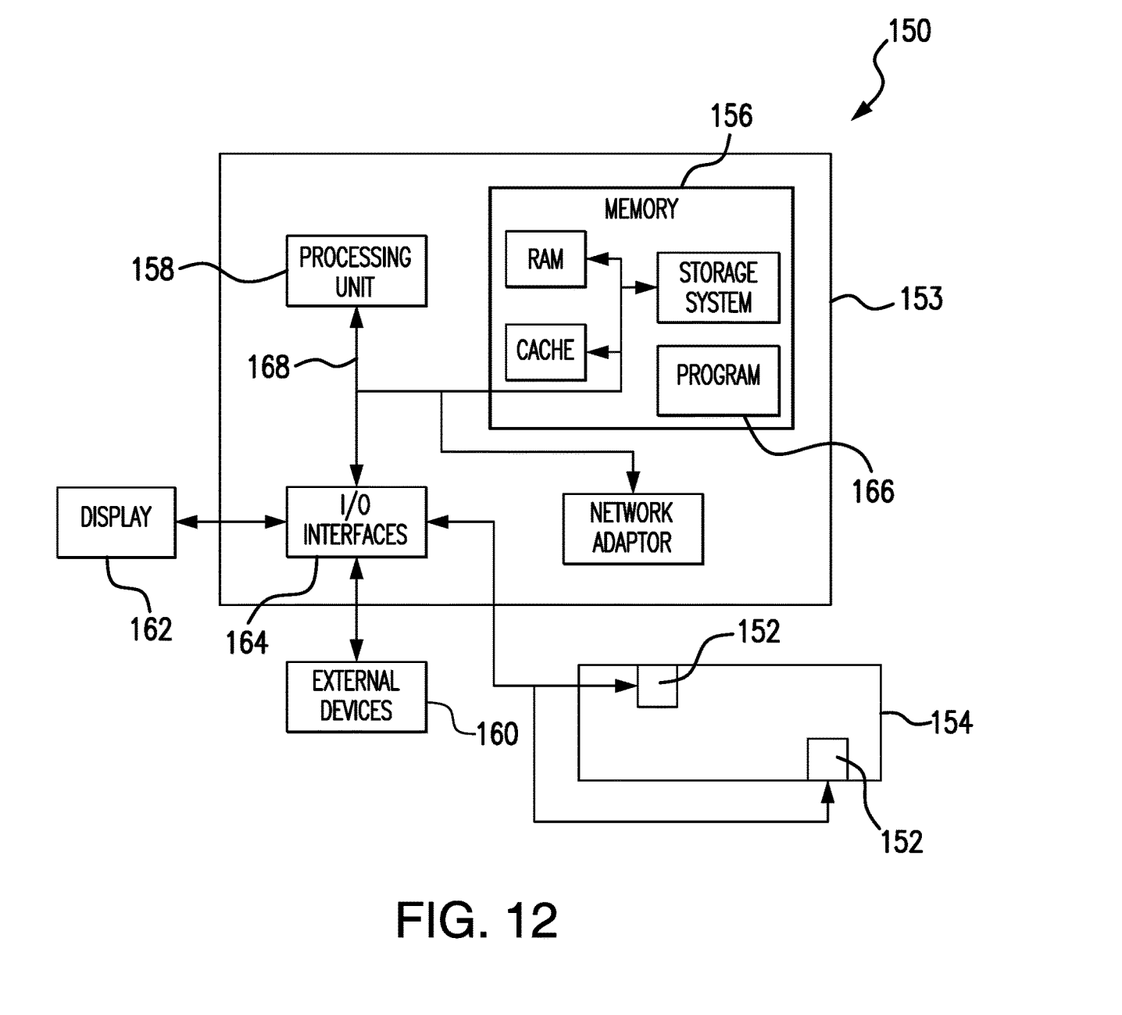
FIG. 12 shows a block diagram of an exemplary embodiment of an aircraft monitoring system in accordance with embodiments of the present disclosure.

The method includes displaying monitoring controllers, e.g. monitoring controllers 110*a*-110*d*. The display of the monitoring controllers 110*a*-110*d* is dynamic (e.g. the display can change depending on which monitoring controllers are being used, or which ones the user wishes to view). For example, if the fuselage is being monitored, monitoring controller 110*b* that corresponds to an aircraft monitoring system, e.g. aircraft monitoring system 150 (described below and shown in FIG. 12), that monitors the fuselage (or the portion thereof) will be displayed. This approach keeps the operator focused on the geometry of the aircraft by enabling in-place status updates within the context of the relevant aircraft geometry. Displaying the graphical representation 102 can include displaying the graphical representation 102 and/or the one or more monitoring controllers 110a-110d on a computing device having a display screen, e.g. display 162, as shown in FIG. 12.

With reference now to FIGS. 1-4, each monitoring controller 110a-110d is associated with a respective aircraft monitoring system 150 (described below), or a portion thereof. The cursor indicator (which is show as an icon of a hand) is optional and may not be necessary in embodiments where a touch interface is used. Moreover, while four cursor indicators are shown, only one is typically shown at one time. The method includes displaying each of the monitoring controllers in a respective position that is closer to the portion of the graphical representation that corresponds to the actual location on the aircraft's geometry associated with the monitoring controller than to other portions of the graphical representation. For example, displaying the graphical representation 102 includes displaying a first portion of the aircraft's geometry, e.g. a wing section 106, and a second portion of the aircraft's geometry, e.g. a fuselage 104. As another example, displaying monitoring controller 110a includes displaying monitoring controller 110a in a position that is closer to the wing section 106 than the fuselage 104, as monitoring controller 110a is associated with at least a portion of an aircraft monitoring system, e.g. system 150, that monitors the actual wing section.

Figure 3:
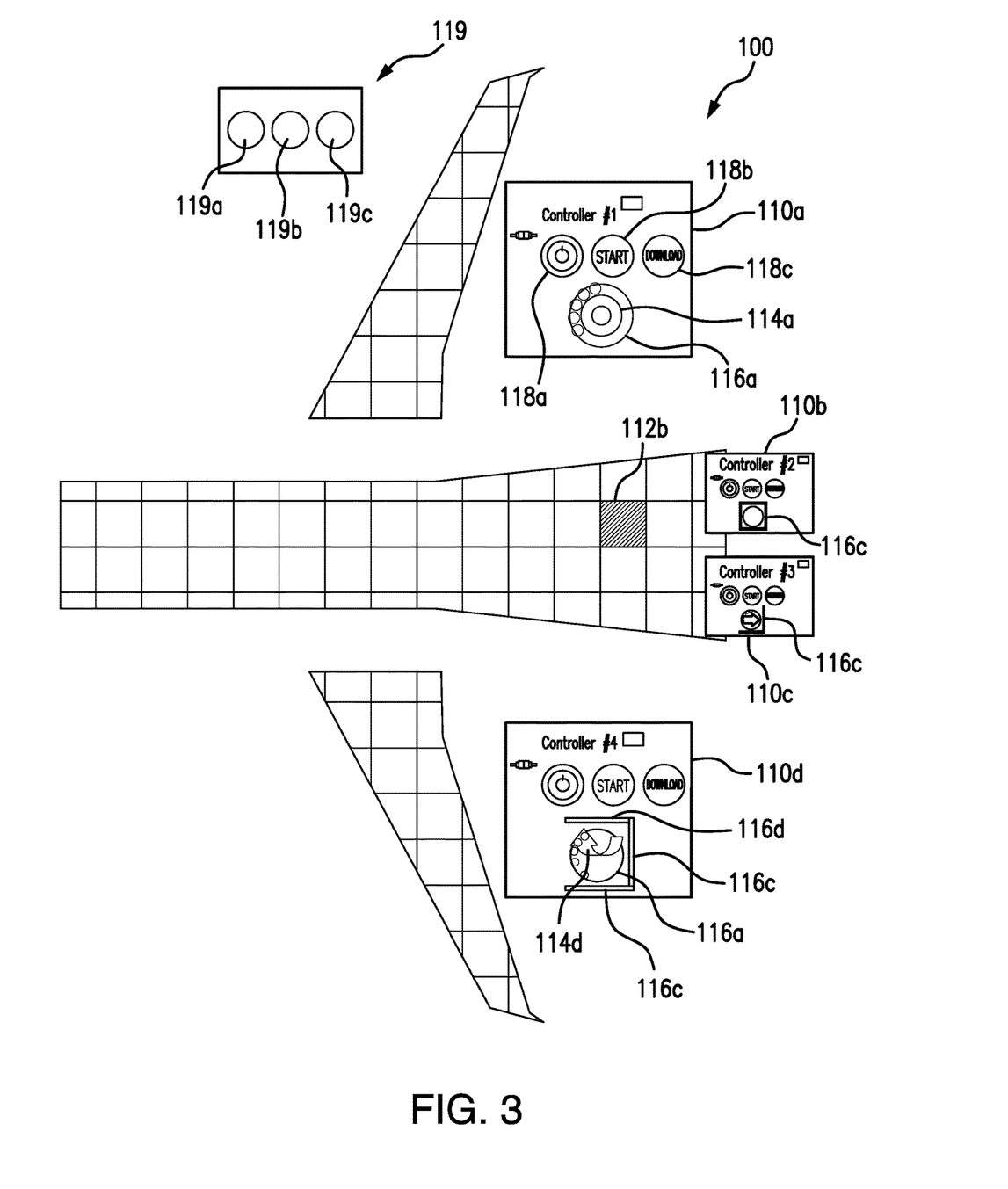
FIG. 3 depicts a graphical representation of an aircraft's geometry and monitoring controllers associated therewith as displayed in a graphical user interface (GUI) in accordance with embodiments of the present disclosure, showing the status indicator and the progress indicator.
Figure 4:
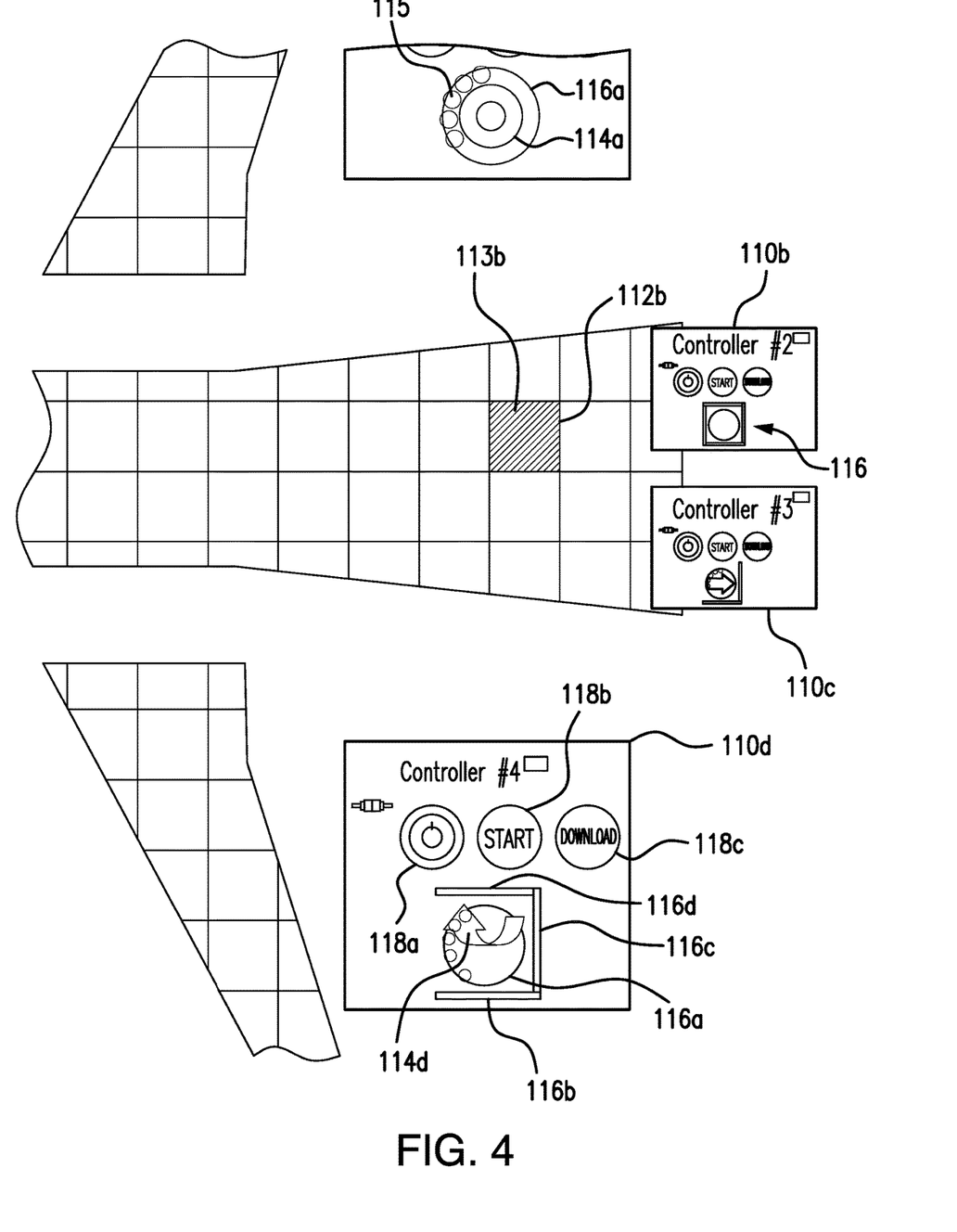
FIG. 4 depicts an enlarged view of the graphical representation of FIG. 3, showing a health status overlaid onto a portion of the graphical representation of the aircraft.

With reference now to FIGS. 3-4, each monitoring controller 110a-110d includes an active progress indicator 114 and at least one of passive status indicators 116a-116e. The method herein includes depicting multiple process states in real-time by way of multiple monitoring controllers 110a-110d, and also provides a second dimension of overall status for each monitoring controller by depicting completion states through passive status indicators 116a-116e alongside one or more real-time, active state indicators, e.g. progress indicators 114. In this way, each monitoring controller 110a-110d reports the status of a given process and a steady progression toward a completion state of that process in real-time and in an easily discernable manner. The passive status indicators 116a-116e, as described in more detail below, remain visible even after the function associated therewith has been completed thereby displaying a de-facto roadmap toward the final completed process state.

With reference now to FIGS. 3-4, each monitoring controller 110a-110d includes respective user entry areas 118a-118c for receiving an "on" command, a "start" command or a "download" command. Each user entry area 118a corresponds to an area for receiving an "on" command, user entry area 118b corresponds to an area for receiving a "start" command and 118c corresponds to an area for receiving a "download" command. User entry areas 118a-118c are dynamically selectable. Moreover, those skilled in the art will readily appreciate that each monitoring controller can include other user entry areas that correspond to other commands and/or functions. Once selected, user entry area 118b is configured and adapted to trigger at least one sensor, e.g. sensor 152, of an aircraft monitoring system, e.g. system 150 (described below) to begin monitoring. User entry area 118c is associated with a downloading function and, when selected, will trigger a downloading function for the portion of the aircraft monitoring system associated therewith. The method also includes providing a user entry area, e.g. user entry area 119, that is configured and adapted to trigger all (or a selected group of) the monitoring controllers, e.g. monitoring controllers 110a-110d (thereby providing the ability to control multiple aircraft monitoring systems or portions thereof) and the corresponding sensors that are operatively connected thereto. User entry area 119 includes three separate user entry areas 119a-119c, similar to 118a-118c, except that user entry areas 119a-119c can trigger monitoring functions (and their respective sub-functions) for a plurality of monitoring controllers.

Monitoring controllers 110a-110d are well-suited to partial processing scenarios. For example, if sensors associated with monitoring controllers 110a-110d have already acquired data and the data is currently stored in memory 156 of aircraft monitoring system 150. The operator can opt to perform a "Download Only" function that downloads pre-existing data from the system 150 without performing a real-time data acquisition. This, in turn, is reflected by the status indicators 116a-116e described below. For example, instead of showing a status indicator 116a associated with acquiring, only 116b-116e would be shown. There are other scenarios where one or more of the process states (and therefore process indicators 116a-116e) could be intentionally skipped. Any skipped process state would be readily ascertainable because of the lack of one or more indicators 116a-116e would be visually apparent.

As shown in FIG. 4, the method includes displaying a plurality of passive status indicators, e.g. one or more of passive status indicators 116a-116e, representative of the status of a monitoring sub-function for the portion of the aircraft monitoring system, e.g. aircraft monitoring system 150, associated therewith. The monitoring functions (e.g. the sub-functions) includes acquiring data, downloading data, transferring data, converting data, analyzing data, and/or uploading data. Status indicators 116a-116e are representative of the end-states for respective sub-functions, e.g. when a given sub-function is in progress or completed, its status indicator is visible. In this way, status indicators 116a-116e readily show the status of the overall monitoring function for a given controller 110a-110d and their associated aircraft monitoring system.

The method includes displaying an active progress indicator, e.g. active progress indicator 114, representative of which of the sub-functions is in progress and/or the status of the sub-function for the portion of the aircraft monitoring system associated therewith. The method includes displaying both the active progress indicator and one of the plurality of passive status indicators to which the active progress indicator relates with a common graphical theme, e.g. the common pattern of active progress indicator 114c and passive status indicator 116c to which it relates, in order for a user to easily ascertain an overall status of the sub-functions. This method of displaying on GUI 100 provides a compact representation of complex status information that can be readily ascertained from a distance. This approach enables the operator to stay focused on incremental results while still viewing the overall status of the system. By utilizing high contrast, well differentiated images, e.g. by way of the patterns shown in FIGS. 6A-9B, it is easier to understand the status of the aircraft monitoring system at a glance (even when viewed from a distance). This results in status monitoring that is conducive to being displayed and viewed on modern devices such as tablets and smartphones.

With continued reference to FIGS. 3-4, the method includes displaying a health status, e.g. the health status indicated by cross-hatching 113b, color or the like, of at least one portion of the aircraft with a health indicator 113b overlaid onto at least one segment, e.g. the segment 105, of the graphical representation of the aircraft's geometry 102 to which the health status pertains. The method includes providing a user entry area associated with the health indicator 113b for receiving user commands to initiate system action. In the embodiment of FIGS. 3-4, user entry area is defined by the segment 112b of the graphical representation 102 overlaid with health indicator 113b, such that by touching, clicking or otherwise selecting segment 112b, a user can select one or more actions to be taken in response to the health indicator. This can include initiating maintenance, scheduling further inspection, or the like.

Figure 5A:
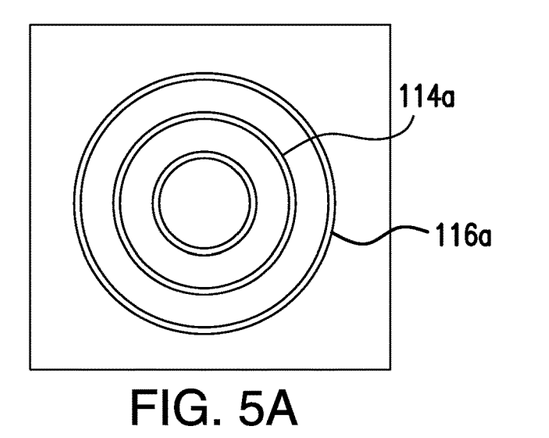
FIG. 5A depicts a status indicator of at least one of the monitoring controllers of FIGS. 2-4, where the status indicator is indicative of the system acquiring data from one or more sensors.
Figure 5B:
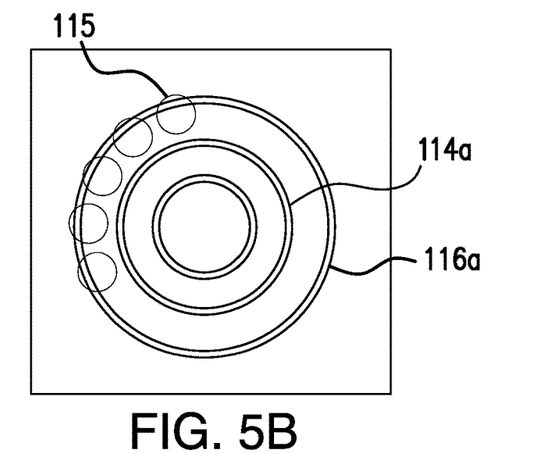
FIG. 5B depicts a status indicator of at least one of the monitoring controllers of FIGS. 2-4, showing a progress icon overlaid thereon.
Figure 5C:
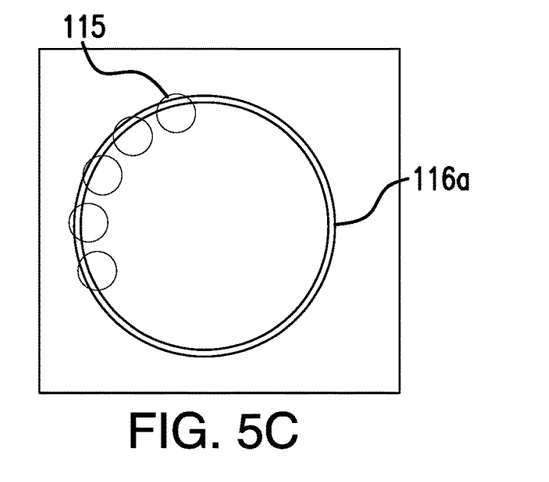
FIG. 5C depicts a status indicator of at least one of the monitoring controllers of FIGS. 2-4, where the status indicator is indicative that the acquiring is complete.

The progression of the display functions of the monitoring controllers 110a-110d of the GUI is depicted by FIGS. 5A-9B. FIGS. 5A-5C depict a portion of one of controllers 110a-110d including a status indicator 116a and a progress indicator 114a. Progress indicator 114a of FIG. 5A is shown as a series of concentric circles and is indicative of an aircraft monitoring system, e.g. aircraft monitoring system 150, acquiring data from one or more sensors, e.g. sensors 152. FIG. 5B is the same as FIG. 5A, except that FIG. 5A includes a progress icon 115. Progress icon 115 in FIG. 5B is shown as a series of circles arranged in an arcuate pattern overlaid on the status indicator 116a. Progress icon 115 can be dynamic, for example, the circles can move in a ring-shaped path along status indicator 116a (as shown by the position change of progress icon 115 from FIG. 6A to 6B) to provide the operator with a sense that the system is continuing to perform a given function, which for FIG. 5B, is acquiring data. It is contemplated that in some embodiments, instead of being circles arranged in an arcuate pattern, a progress icon 115 can give more detail about the progress within a particular state (e.g. depicting percent complete overlaid on top of the particular status indicator 116). FIG. 5C shows status indicator 116a without progress indicator 114a. In FIG. 5C, status indicator 116a is a single circle that indicates that the acquiring is completed. The completion of the acquiring function is represented by the single circle without the inner concentric circles (e.g. the progress indicator 114a) being present.

Figure 6A:
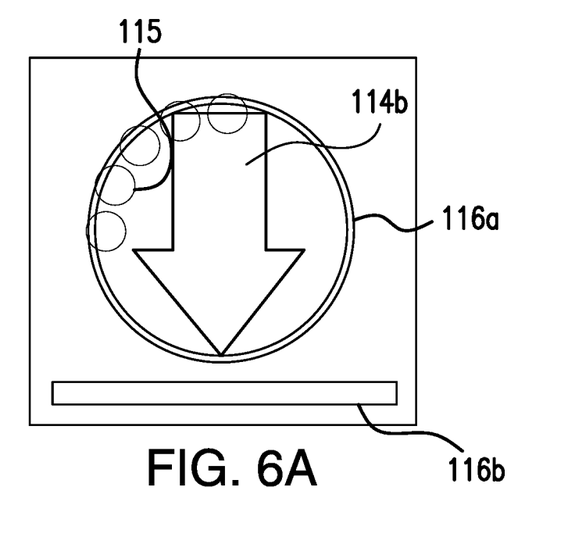
FIG. 6A depicts two status indicators and a progress indicator of at least one of the monitoring controllers of FIGS. 2-4, wherein the progress indicator is indicative of downloading data.
Figure 6B:
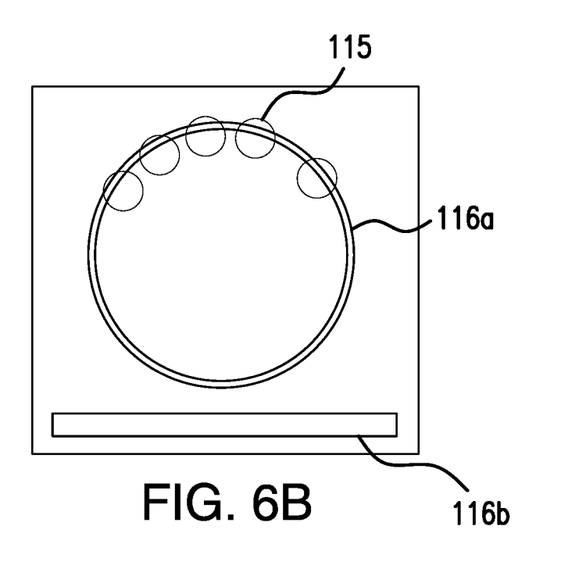
FIG. 6B depicts two status indicators and a progress indicator of at least one of the monitoring controllers of FIGS. 2-4, where at least one of the status indicators is indicative that the downloading is complete.

FIGS. 6A-6B depict two status indicators 116a and 116b and a progress indicator 114b. In FIG. 6A, status indicators for two separate functions, e.g. the acquiring/acquired (116a) and the downloading/downloaded (116b), are shown. In FIG. 6A, status indicator 116a represents the "acquired" state (due to the absence of the concentric circles). The presence of progress indicator 114b (in the form of a downward arrow), is indicating that the downloading function is still in progress. In FIG. 6B, the end state for downloading is shown. In this depiction, status indicator 116b shows the end-state for "downloaded" as a bar positioned underneath status indicator 116a. (which has a circular shape). The status indicators 116a and 116b of FIG. 6B, without progress indicator 114b, indicate that the system has finished acquiring and downloading.

Figure 7A:
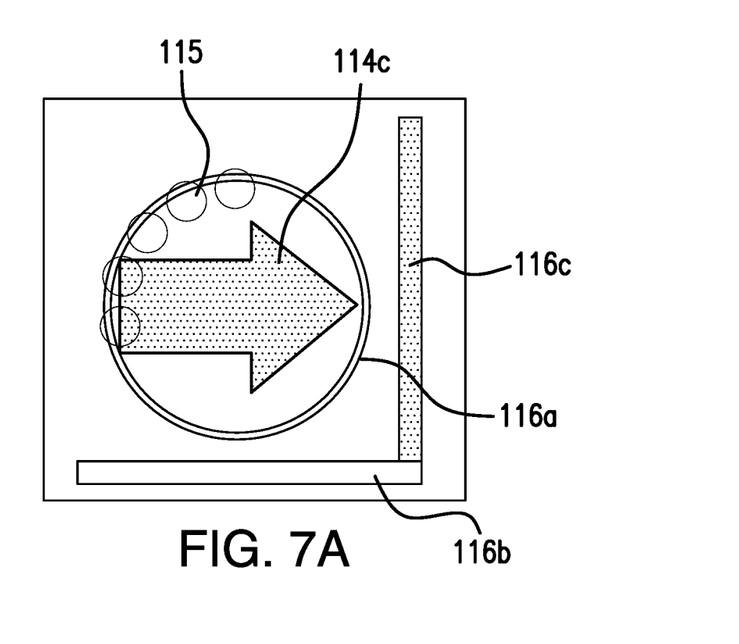
FIG. 7A depicts three status indicators and a progress indicator of at least one of the monitoring controllers of FIGS. 2-4, wherein the progress indicator is indicative of transferring data.
Figure 7B:
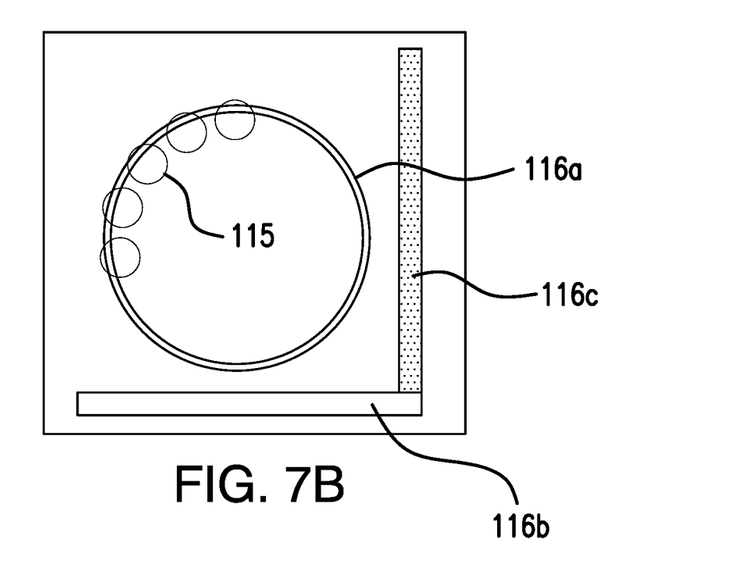
FIG. 7B depicts three status indicators and a progress indicator of at least one of the monitoring controllers of FIGS. 2-4, where at least one of the status indicators is indicative that the transferring is complete.

FIGS. 7A-7B depict three status indicators 116a-116c and a progress indicator 114c, which is shown as a sideways facing arrow. The direction of arrow 114c (e.g. progress indicator) is pointing toward the status that is in progress, which in the case of FIG. 7A is the transferring of data. In FIG. 7A, the acquiring and downloading functions have been completed and are signified by status indicators 116a and 116b. Status indicator 116c and active progress indicator 114c also share a common pattern. In a display, this pattern indicates to a user that the progress indicator 114c relates to status indicator 116c. A common graphical theme (pattern, color, or the like) can be used for other status indicators, e.g. 116a, 116b and 116d-116e, and their respective progress indicators 114a-114b and 114d-114e. Each set can have a distinct pattern so as to easily distinguish between them, e.g. 116a and 114a can be striped as to distinguish between the dotted pattern of 116c and 114c. In FIG. 7B, the completion of the transferred state is shown by status indicator 116c, e.g. the vertical bar on the right-hand side of status indicator 116a, without the progress indicator 114c being present. The pattern or graphical theme of status indicator 116c remains in order to distinguish from other status indicators. Those skilled in the art will readily appreciate that the status indicators 116a and 116b for acquiring and downloading are also depicted, thereby showing a steady progression toward a final completion state. Status indicators 116a and 116b could also retain their respective colors or patterns in order to distinguish between the status indicators.

Figure 8A:
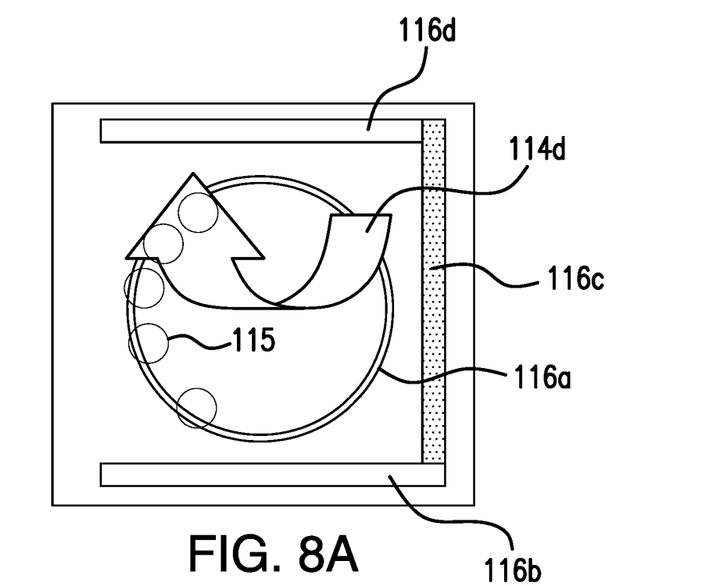
FIG. 8A depicts four status indicators and a progress indicator of at least one of the monitoring controllers of FIGS. 2-4, wherein the progress indicator is indicative of converting data.
Figure 8B:
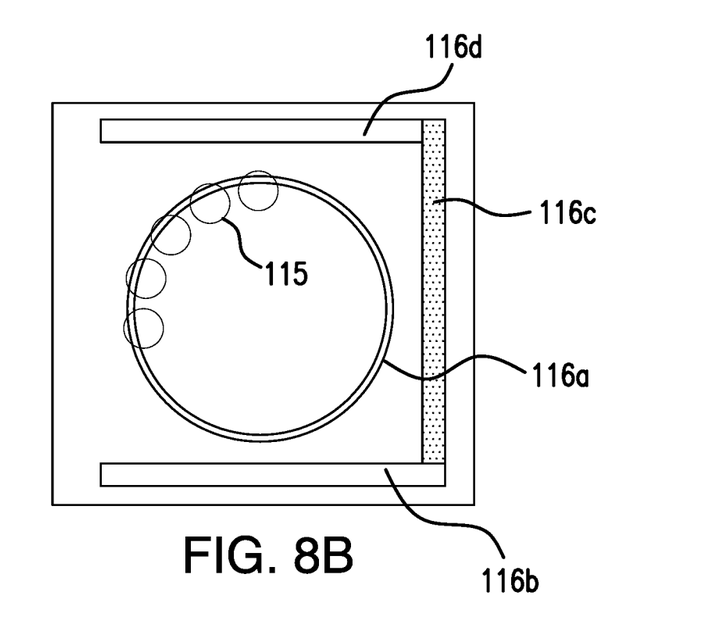
FIG. 8B depicts four status indicators and a progress indicator of at least one of the monitoring controllers of FIGS. 2-4, wherein at least one of the status indicators is indicative that the converting is complete.

FIGS. 8A-8B depict four status indicators 116a-116d and a progress indicator 114d. In FIG. 8A, progress indicator 114d is a looped arrow which indicates that the system is converting data. In FIG. 8A, the acquiring, downloading and transferring has been completed and each completed function is signified by a respective status indicator 116a, 116b and 116c. In FIG. 8B, the completion of the converting is represented by the horizontal bar of status indicator 116d on the top side of status indicator 116a without the progress indicator 114d being present. Those skilled in the art will readily appreciate that the status indicators 116a, 116b and 116c for acquiring, downloading and transferring are also depicted in FIG. 8B, thereby showing a steady progression toward a final completion state.

Figure 9A:
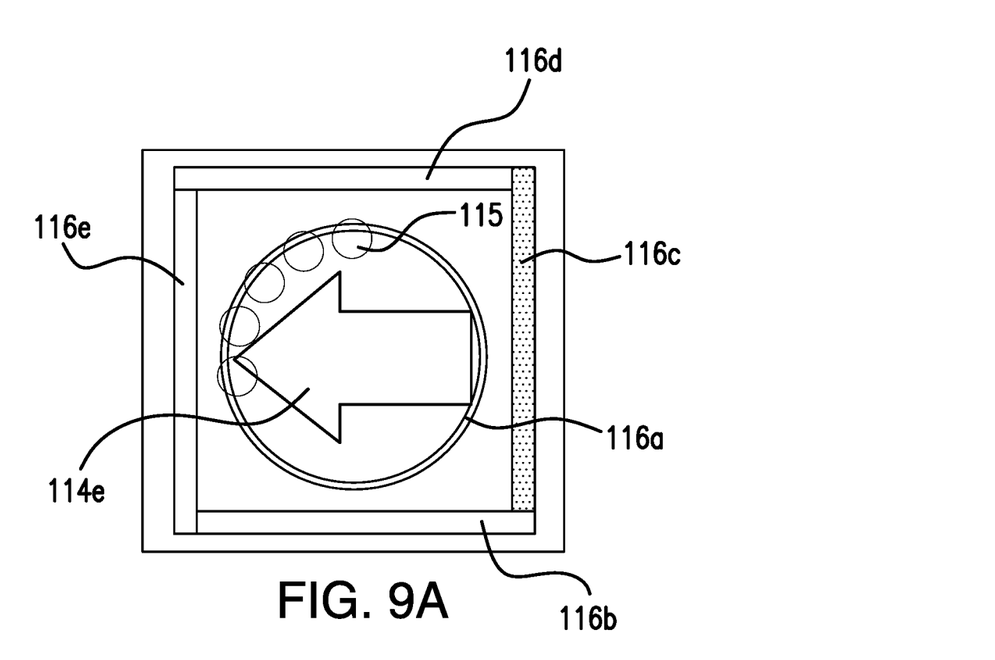
FIG. 9A depicts five status indicators in accordance and a progress indicator of at least one of the monitoring controllers of FIGS. 2-4, wherein the progress indicator is indicative of analyzing data.
Figure 9B:
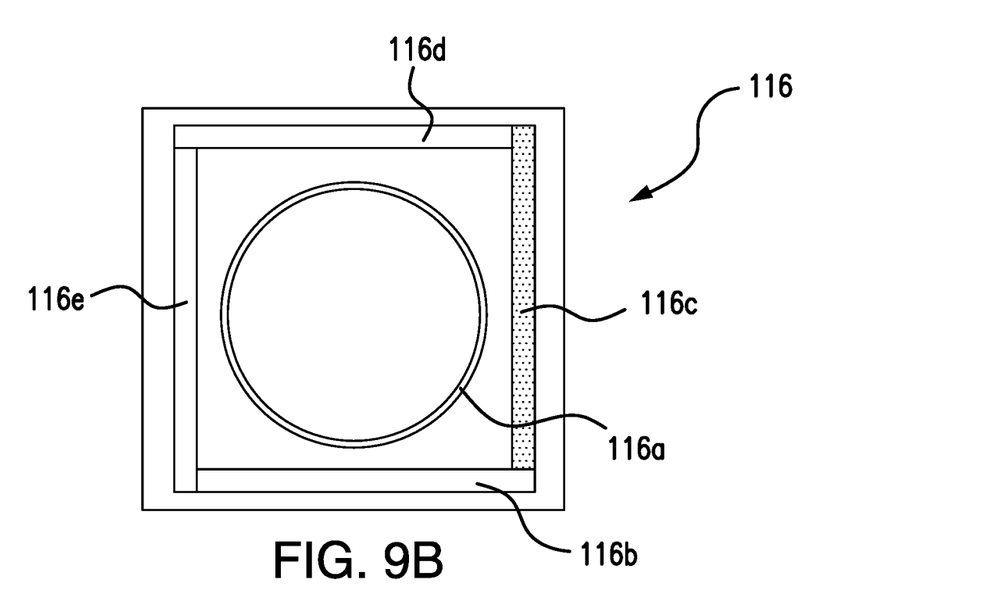
FIG. 9B depicts four status indicators and a progress indicator of at least one of the monitoring controllers of FIGS. 2-4, wherein at least one of the status indicators is indicative that the analyzing is complete.

FIG. 9A depicts five status indicators 116a-116e and a progress indicator 114e. The progress indicator 114e is indicative of the system analyzing data. In FIG. 9B, the progress icon 115 is no longer shown as the analyzing function and the overall system process has been completed, which results in a completed status indicator 116. Once ready, the results associated with a given monitor controller 110a-110d are depicted as overlays on the aircraft geometry to which they correspond, as shown by the cross-hatched pattern in portion 112b of FIG. 4. While the five status indicators 116a-116e, their respective progress indicators 114a-114e, and their given functions are described above as being displayed/performed in a sequence, those skilled in the art will readily appreciate that the display of at least two of the status indicators 116a-116e can be initiated concurrently with one another, or in a different order from that described above, and/or that the display of at least two of the progress indicators 114a-114e can be initiated concurrently with one another, or in a different order from that described above.

Figure 10:
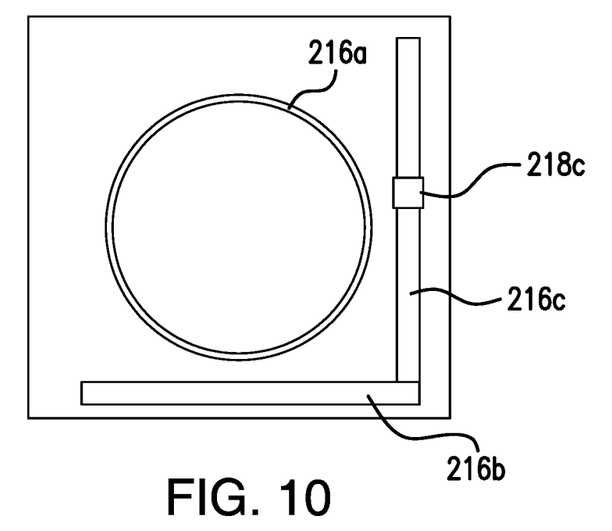
FIG. 10 depicts three status indicators in accordance with embodiments of the present disclosure and an error indicator overlaid on one of the status indicators.

As shown in FIG. 10, in accordance with some embodiments, a status indicator 216c includes an error indicator 218c. In this way, status indicator 216c is used to show the status of a given function of the system, like status indicator 116c, but also depicts whether there is an error in the function represented by status indicator 216c. Error indicator 218c is overlaid on status indicator 216c to depict this. Other error indicators, like 218c, can be used in conjunction with 116a-116b, and/or 116d-116e. FIG. 10 depicts three status indicators 216a-216c that each correspond to a different function of the system, which are similar to 116a-116c. Noticeably, no progress indicator, e.g. 114c, or progress icon, e.g. progress icon 115, is shown because the progress was interrupted by an error, which prompts the display of error indicator 218c. Error indicator 218c is shown overlaid on the status indicator 116c for the corresponding function (in this instance, transferring) that has the error. It is also contemplated that error indicator 218c could be a cancellation indicator or other end state. It is also contemplated that, in view of an error, a progress icon, e.g. progress icon 115, could be included, for example, if the detected error does not stop the progress of the overall system.

Those skilled in the art will readily appreciate that the specific graphics and icons (e.g. arrows, bars, circles, etc.) listed above are only one example of the concept represented by this approach. The geometry of the graphics can be varied while still conforming to the embodiments of the present invention. For example, the styling of the graphics is flexible in this approach. The important piece is to include at least the following secondary states for each process state and to ensure that the styling sufficiently distinguishes between different states even when viewed from a distance. Moreover, while the graphics are depicted herein in black and white, varying patterns and/or colors may be used. For example, status indicators 116a-116e can be colored teal, orange, blue, fuchsia and green, respectively. The dynamic progress indicators 114a-114e can be similarly colored or patterned to match their associated status indicators, 116a-116e, respectively. There are a variety of suitable colors that may be used. As long as the colors provide sufficient contrast with the background color to distinguish them from any background and that bright enough colors are used (again, relative to the background) to ensure that the differences in state can be easily detected from a distance.

Figure 11:
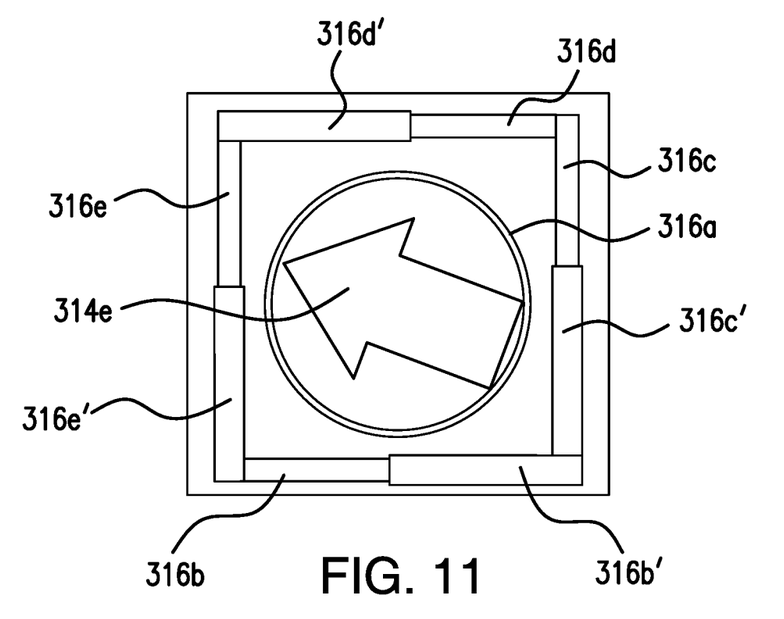
FIG. 11 depicts three status indicators in accordance with embodiments of the present disclosure and an error indicator overlaid on one of the status indicators.

With reference now to FIG. 11, another embodiment of status indicators and progress indicator is shown. FIG. 11 shows nine status indicators 316a-316e'. A square is formed by eight of the status indicators 316b-316e' and a circle in the middle of the square is the ninth status indicator 316a. Each side of the square is broken into two regions, e.g. 316a and 316a'. In the embodiment of FIG. 11, the arrow used for progress indicator 314 is angled toward its final state, or the state in progress, or in any other suitable way that designates which state it applies.

Those skilled in the art will readily appreciate that the shapes used for progress indicators 114a-e, 214 and 314 do not have to be an arrow or concentric circles. Moreover, the shapes used for status indicators 116a-116e, 216a-216e and 316a-316e' do not have to be a circle or a bar. Depending on the number of system functions and statuses, the status indicators can form a square without a circle, a triangle with a circle, a trapezoid and so on.

FIG. 12 shows a block diagram of an exemplary embodiment of an aircraft monitoring system 150 in accordance with embodiments of the present disclosure. The aircraft monitoring system 150 includes a plurality of sensors 152 operatively connected to at least a portion of an aircraft 154. The system 150 includes a computer system 153 having a memory 156 configured to store instructions, and a processor 158 disposed in communication with the memory and the sensor. The processor 158, upon execution of the instructions, is configured to display a graphical representation of at least a portion of an aircraft, e.g. graphical representation 102, and display a monitoring controller, e.g. at least one of monitoring controllers 110a-110d, as shown in FIGS. 1-4, on a display 162. Each monitoring controller includes an active progress indicator representative of the function of the system 150. Each monitoring controller includes at least one status indicator representative of the status of the system 150, or a function thereof.

In accordance with another embodiment, a method for monitoring an aircraft with an aircraft monitoring system, e.g. system 150, includes acquiring data with at least one sensor, e.g. sensor 152, and downloading the data from the sensor to a computer system, e.g. computer system 153. The method includes analyzing the data with the computer system (or another computer system external to the aircraft monitoring system) and includes providing a GUI as described above. For example, displaying a graphical representation, e.g. graphical representation 102, of a portion of an aircraft on a display, e.g. display 162. The method includes displaying a monitoring controller, e.g. at least one of monitoring controllers 110a-110d, on the display.

In various embodiments, computer system 153 may be a server, a mainframe computer system, a workstation, a network computer, a desktop computer, a laptop, a tablet computer, a smartphone or the like, and/or include one or more of a field-programmable gate array (FPGA), application specific integrated circuit (ASIC), microcontroller, microprocessor, or the like.

Computer system 153 is only one example of a suitable system and is not intended to suggest any limitation as to the scope of use or functionality of embodiments of the disclosure described herein. Regardless, computer system 153 is capable of being implemented and/or performing any of the functionality set forth hereinabove.

Computer system 153 may be described in the general context of computer system-executable instructions, such as program modules, being executed by a computer system. Generally, program modules may include routines, programs, objects, components, logic, data structures, and so on that perform particular tasks or implement particular abstract data types. Computer system 153 may be practiced in distributed data processing environments where tasks are performed by remote processing devices that are linked through a communications network. In a distributed data processing environment, program modules may be located in both local and remote computer system storage media including memory storage devices.

Computer system 153 is shown in FIG. 12 in the form of a general-purpose computing device. The components of computer system 153 may include, but are not limited to, one or more processors or processing units 158, a system memory 156, and a bus 168 that couples various system components including system memory 156 to processor 158.

Bus 168 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 153 typically includes a variety of computer system readable media. Such media may be any available media that is accessible by any portions of system 150, and it includes both volatile and non-volatile media, removable and non-removable media.

System memory 156 can include computer system readable media in the form of volatile memory, such as random access memory (RAM) and/or cache memory. Computer system 153 may further include other removable/non-removable, volatile/non-volatile computer system storage media, e.g. such as flash memory by way of a USB (universal serial bus). By way of example only, a storage system can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 168 by one or more data media interfaces. As will be further depicted and described below, memory 156 may include at least one program product having a set (e.g., at least one) of program modules that are configured to carry out the functions of embodiments of the present disclosure.

Program/utility 166, having a set (at least one) of program modules may be stored in memory 156 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the present disclosure as described herein.

Computer system 153 may also communicate with one or more external devices 160 such as a keyboard, a pointing device, a display 162, etc.; one or more devices that enable a user to interact with computer system 153; and/or any devices (e.g., network card, modem, etc.) that enable display 162, external devices 160 or sensors 152 to communicate with one or more other computing devices. Such communication can occur via Input/Output (I/O) interfaces 164. Still yet, computer system 153 can communicate with one or more networks such as a local area network (LAN), a general wide area network (WAN), and/or a public network (e.g., the Internet) via a network adapter. As depicted, the network adapter communicates with the other components of the system 150 via bus 168. It should be understood that although not shown, other hardware and/or software components could be used in conjunction with computer system 153. Examples, include, but are not limited to: microcode, device drivers, redundant processing units, external disk drive arrays, RAID systems, tape drives, and data archival storage systems, etc.

The block diagrams in the Figures illustrate the architecture, functionality, and operation of possible implementations of systems, methods and computer program products according to various embodiments of the present disclosure. In this regard, each block in the block diagrams may represent a module, segment, or portion of code, which comprises one or more executable instructions for implementing the specified logical function(s). It should also be noted that, in some alternative implementations, the functions noted in the block or in the above detailed description may occur out of the order noted in the figures or described in the above detailed description. For example, two blocks or functions shown/described in succession may, in fact, be executed substantially concurrently, or the blocks or functions may sometimes be executed in the reverse order, depending upon the functionality involved. It will also be noted that each block of the block diagrams, function described in the above detailed description, combinations of blocks in the block diagrams or combination of functions described in the above detailed description, can be implemented by special purpose hardware-based systems that perform the specified functions or acts, or combinations of special purpose hardware and computer instructions.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the illustrated embodiments, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of the present disclosure include software algorithms, programs, or code that can reside on a computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the logic, equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

The methods and systems of the present disclosure, as described above and shown in the drawings, provide for a method of providing a graphical user interface (GUI) for an aircraft monitoring system with superior properties including a more compact display, ease of use and multi-dimensional display of information. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An aircraft monitoring system comprising:
 a sensor operatively connected to at least a portion of an aircraft;
 a memory configured to store instructions;
 a processor disposed in communication with the memory and the sensor, wherein the processor, upon execution of the instructions is configured to:
  display a graphical representation of the portion of the aircraft; and
  display a monitoring controller, wherein the monitoring controller is associated with the portion of the aircraft
 wherein displaying the monitoring controller includes displaying the monitoring controller in a respective position more proximate to a portion of a graphical representation that corresponds to a location on the aircraft's geometry associated with the monitoring controller than to other portions of the graphical representation, wherein displaying the monitoring controller includes displaying, a plurality of passive status indicators indicative of statuses of respective sub-functions and, simultaneously, an active progress indicator indicative of which of the sub-functions is in progress.

2. The system as recited in claim 1, wherein each monitoring controller includes an active progress indicator representative of the progress of a monitoring sub-function for the portion of the aircraft in real-time.

3. The system as recited in claim 1, wherein each monitoring controller includes at least one status indicator representative of the real-time status of an overall monitoring function for the portion of the aircraft.

4. A non-transitory computer readable storage medium having one or more computer programs stored therein associated with an aircraft monitoring system, the computer programs comprising instructions, which when executed by a processor of a computer system, cause the processor to:
display a graphical representation of at least a portion of an aircraft's geometry; and
display one or more monitoring controllers, wherein each monitoring controller is associated with at least a portion of the aircraft monitoring system and a location on the aircraft's geometry
wherein displaying the one or more monitoring controllers includes displaying each monitoring controller in a respective position more proximate to a portion of the graphical representation that corresponds to the location on the aircraft's geometry associated with the monitoring controller than to other portions of the graphical representation, wherein displaying the one or more monitoring controllers includes displaying, for each monitoring controller, a plurality of passive status indicators indicative of statuses of respective sub-functions and, simultaneously, an active progress indicator indicative of which of the sub-functions is in progress.

5. The non-transitory computer readable storage medium as recited in claim 4, wherein at least one of the one or more monitoring controllers is positioned in a respective position more proximate to a portion of the graphical representation that corresponds to the location on the aircraft's geometry associated with the monitoring controller than to other portions of the graphical representation.

6. A method of providing a graphical user interface (GUI) for an aircraft monitoring system, the method comprising:
displaying a graphical representation of at least a portion of an aircraft's geometry; and
displaying one or more monitoring controllers, wherein each monitoring controller is associated with at least a portion of an aircraft monitoring system and a location on the aircraft's geometry,
wherein displaying the one or more monitoring controllers includes displaying each monitoring controller in a respective position more proximate to a portion of the graphical representation that corresponds to the location on the aircraft's geometry associated with the monitoring controller than to other portions of the graphical representation, wherein displaying the one or more monitoring controllers includes displaying, for each monitoring controller, a plurality of passive status indicators indicative of statuses of respective sub-functions and, simultaneously, an active progress indicator indicative of which of the sub-functions is in progress.

7. The method as recited in claim 6, wherein displaying the graphical representation includes displaying a first portion of the aircraft's geometry and a second portion of the aircraft's geometry, wherein displaying the one or more monitoring controllers includes displaying a first monitoring controller associated with the first portion, wherein the first monitoring controller is positioned closer to the first portion than the second portion.

8. The method as recited in claim 6, wherein displaying the one or more monitoring controllers, includes displaying, for each monitoring controller, at least one of an active progress indicator or a passive status indicator.

9. The method as recited in claim 6, wherein the method includes displaying both the active progress indicator and one of the plurality of passive status indicators to which the active progress indicator relates with a common graphical theme in order for a user to easily ascertain an overall status of the sub-functions.

10. The method as recited in claim 6, wherein each monitoring controller includes a user entry area for receiving at least one of an on command, a start command or a download command.

11. The method as recited in claim 6, further comprising providing a user entry area for receiving a start command configured and adapted to begin monitoring functions for a plurality of monitoring controllers.

12. The method as recited in claim 6, wherein the method includes displaying an active progress indicator that corresponds to the monitoring controller and is representative of the progress of a monitoring sub-function for the portion of the aircraft monitoring system associated therewith.

13. The method as recited in claim 11, wherein the monitoring sub-function includes least one of a acquiring data, downloading data, transferring data, converting data or uploading data.

14. The method as recited in claim 6, wherein the method includes displaying a passive status indicator representative of the status of a monitoring function for the portion of the aircraft monitoring system associated therewith.

15. The method as recited in claim 6, further comprising displaying a health status of at least one portion of the aircraft with a health indicator overlaid onto a portion of the graphical representation of the aircraft to which the health status pertains.

16. The method as recited in claim 6, further comprising displaying a health status of at least one portion of the aircraft with a health indicator and providing a user entry area associated with the health indicator for receiving user commands to initiate system action.

17. The method as recited in claim 6, wherein displaying the graphical representation includes displaying the graphical representation on a computing device having a display screen.

18. The method as recited in claim 6, wherein displaying the one or more monitoring controllers includes displaying the one or more monitoring controllers on a computing device having a display screen.

* * * * *